United States Patent
Fan et al.

(10) Patent No.: US 8,750,909 B2
(45) Date of Patent: Jun. 10, 2014

(54) METHOD, SYSTEM, AND APPARATUS FOR PROCESSING A SERVICE MESSAGE WITH A PLURALITY OF TERMINALS

(75) Inventors: Shunan Fan, Shenzhen (CN); Jian Yang, Shenzhen (CN); Lei Wang, Shenzhen (CN); Hao Wang, Shenzhen (CN); Guoqiao Chen, Shenzhen (CN); Ting Dong, Shenzhen (CN); Huiping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 12/562,888

(22) Filed: Sep. 18, 2009

(65) Prior Publication Data
US 2010/0009704 A1 Jan. 14, 2010

Related U.S. Application Data

(63) Continuation of application No. PCT/CN2008/073016, filed on Nov. 11, 2008.

(30) Foreign Application Priority Data

Nov. 13, 2007 (CN) .......................... 2007 1 0169427

(51) Int. Cl.
*H04W 4/00* (2009.01)
*H04L 29/06* (2006.01)
(52) U.S. Cl.
USPC ........................................ 455/466; 455/414.3
(58) Field of Classification Search
USPC ................. 455/466, 404.1–404.2, 414.1–417
See application file for complete search history.

(56) References Cited

U.S. PATENT DOCUMENTS

| 2003/0026231 | A1 | 2/2003 | Brown et al. |
| 2004/0083282 | A1 | 4/2004 | Shiga et al. |
| 2004/0107441 | A1 | 6/2004 | Ichiyoshi |
| 2004/0235535 | A1 | 11/2004 | Kajiwara et al. |

(Continued)

FOREIGN PATENT DOCUMENTS

| CN | 1239791 A | 12/1999 |
| CN | 1605221 A | 4/2005 |

(Continued)

OTHER PUBLICATIONS

Office action issued in corresponding Chinese patent application No. 200710169427.4, Oct. 9, 2009, 15 pages.

(Continued)

*Primary Examiner* — Marisol Figueroa
*Assistant Examiner* — Erica Navar
(74) *Attorney, Agent, or Firm* — Leydig, Voit & Mayer, Ltd.

(57) ABSTRACT

A method, system, and apparatus for processing a service message with multiple terminals are disclosed. The method includes: receiving a request message from a terminal, where the request message carries request information of the terminal; and sending a service message to the terminal according to the request information. When a user has multiple terminals, the PPG selects a specific terminal for receiving an incoming service according to the SUBSCRIBE request of the terminal and the terminal request information carried in the SUBSCRIBE request. When a service arrives, the service message is sent to the selected terminal, thus avoiding sending of the service message to all terminals of the user.

14 Claims, 21 Drawing Sheets

(56) References Cited

U.S. PATENT DOCUMENTS

| | | |
|---|---|---|
| 2005/0138123 A1 | 6/2005 | Yun et al. |
| 2006/0142036 A1* | 6/2006 | Lim .......................... 455/518 |
| 2006/0256790 A1* | 11/2006 | Kondou et al. ............. 370/392 |
| 2007/0127494 A1 | 6/2007 | Carter et al. |
| 2008/0182614 A1* | 7/2008 | Cormier et al. ........... 455/552.1 |
| 2008/0281971 A1* | 11/2008 | Leppanen et al. .......... 709/228 |
| 2010/0077038 A1 | 3/2010 | Boberg et al. |
| 2010/0317330 A1 | 12/2010 | Klein et al. |

FOREIGN PATENT DOCUMENTS

| | | | |
|---|---|---|---|
| CN | 1845550 A | | 10/2006 |
| CN | 1953377 A | | 4/2007 |
| EP | 1351461 A1 | | 10/2003 |
| JP | 2001249878 A | | 9/2001 |
| JP | 2001325279 A | | 11/2001 |
| JP | 2002218541 A | | 8/2002 |
| JP | 2004056508 A | | 2/2004 |
| JP | 2004153352 A | | 5/2004 |
| JP | 2004179992 A | | 6/2004 |
| JP | 2004349791 A | | 12/2004 |
| JP | 2005354324 A | | 12/2005 |
| JP | 2007116212 A | | 5/2007 |
| JP | 2010514251 A | | 4/2010 |
| JP | 2011512748 A | | 4/2011 |
| KR | 20000005742 A | | 1/2000 |
| WO | 02100066 A1 | | 12/2002 |
| WO | 2005086519 A1 | | 9/2005 |

OTHER PUBLICATIONS

Adam Roach: "SIP-Specific Event Notification," Internet Engineering Task Force, Feb. 2002, 38 pages.

M. Handley et al.: "SIP: Session Initiation Protocol," Network Working Group, Mar. 1999, 153 pages.

Search report issued in corresponding European patent application No. EP08854942.3, Oct. 14, 2010, 5 pages.

Written opinion issued in corresponding PCT application No. PCT/CN2008/073016, Feb. 19, 2009, 4 pages.

"Push Over the Air," Candidate Version 2.2, Open Mobile Alliance, Oct. 2, 2007, 53 pages.

Office action issued in corresponding Japanese patent application No. JP2010-508691, dated Mar. 13, 2012, and English translation thereof, 9 pages total.

Notice of Allowance issued in corresponding Japanese patent application 2010-508691, dated Dec. 17, 2012, and English translation thereof, total 4 pages.

* cited by examiner

| | |
|---|---|
| Subscribe sip:john.doe@home1.net SIP/2.0 | User ID |
| Via: | SIP/2.0/UDP |
| [5555::aaa:bbb:ccc:ddd]:1357;comp=sigcomp;branch=z9hG4bKnashds7 | |
| Max-Forwards: 70 | |
| Route: <sip:pcscf1.visited1.net:7531;lr;comp=sigcomp>, <sip:orig@scscf1.home1.net;lr> | |
| From: <sip:john.doe@home1.net>;tag=31415 | |
| To: <sip:john.doe@home1.net> | |
| Accept-Contact: *;+g.oma.icsi.push';+ g.oma.iari.push.PushSyncML;;require;explicit | |
| Event:ua-profile: profile-type=oma-app;appid="+g.oma.iari.push.mms.ua" | Subscribing to MMS |
| Call-ID: b89rjhnedlrfjflslj40a222 | |
| CSeq: 85 Subscribe | |
| P-Preferred-Identity: "John Doe" <sip:john.doe@home1.net> | |
| Privacy: none | |
| Expires: 600000 | |
| Accept: application/vnd.syncml.ds.notification | |
| Contact: <sip:[5555::aaa:bbb:ccc:ddd]:1357;comp=sigcomp> | Device ID, which differentiates between terminals |
| Content-Length: 0 | |

FIG. 5

```
SIP/2.0 200 OK

Via: SIP/2.0/UDP [5555::aaa:bbb:ccc:ddd]

Via: SIP/2.0/UDP [5555::aaa:bbb:ccc:ddd]

From: <sip:john.doe@home1.net>

To: <sip:john.doe@home1.net>;tag=31415

Call-ID: b89rjhnedlrfjflslj40a222

CSeq: 85 Subscribe

Contact: <sip:[5555::aaa:bbb:ccc:ddd]:1357;comp=sigcomp>

Content-Type: application/sdp
```

FIG. 6

```
NOTIFY sip:[5555::aaa:bbb:ccc:ddd]:1357;comp=sigcomp SIP/2.0

Via: SIP/2.0/UDP psadm1.home1.net;branch=z9hG4bK332b23.1

Max-Forwards: 70

Route: <sip:scscf1.home1.net;lr>, <sip:pcscf1.visited1.net:7531;lr;comp=sigcomp>

From: <sip:john.doe@home1.net>;tag=31415

To: <sip:john.doe@home1.net>;tag=151170

Call-ID: b89rjhnedlrfjflslj40a222

CSeq: 102 NOTIFY

Subscription-State: active;expires=600000        Activating MMS subscription

Event: ua-profile

Contact: <sip:psadm1.home1.net>

Content-Length: 0
```

FIG. 7

| | |
|---|---|
| Subscribe sip:john.doe@home1.net SIP/2.0 | User ID |
| Via: | SIP/2.0/UDP |

[5555::aaa:bbb:ccc:ddd]:1357;comp=sigcomp;branch=z9hG4bKnashds7

Max-Forwards: 70

Route: <sip:pcscf1.visited1.net:7531;lr;comp=sigcomp>, <sip:orig@scscf1.home1.net;lr>

From: <sip:john.doe@home1.net>;tag=31415

To: <sip:john.doe@home1.net>

Accept-Contact: *;+g.oma.icsi.push';+ g.oma.iari.push.PushSyncML;;require;explicit Event:ua-profile: profile-type=oma-app;appid="+g.oma.iari.push.mms.ua"   Subscribing to MMS

Call-ID: b89rjhnedlrfjflslj40a222

CSeq: 85 Subscribe

P-Preferred-Identity: "John Doe" <sip:john.doe@home1.net>

Privacy: none

Expires: 600000

Accept: application/vnd.syncml.ds.notification

Contact: <sip:[5555::aaa:bbb:ccc:ddd]:1357;comp=sigcomp>   Device ID, which differentiates between terminals

Content-Length: 0

FIG. 8

| | |
|---|---|
| Subscribe sip:john.doe@home1.net SIP/2.0 | User ID |
| Via: | SIP/2.0/UDP |

[5555::aaa:bbb:ccc:ddd]:1357;comp=sigcomp;branch=z9hG4bKnashds7

Max-Forwards: 70

Route: <sip:pcscf1.visited1.net:7531;lr;comp=sigcomp>, <sip:orig@scscf1.home1.net;lr>

From: <sip:john.doe@home1.net>;tag=31415

To: <sip:john.doe@home1.net>

Accept-Contact: *;+g.oma.icsi.push';+ g.oma.iari.push.PushSyncML;;require;explicit Event:ua-profile: profile-type=oma-app;appid="+g.oma.iari.push.mms.ua"  Subscribing to MMS

Call-ID: b89rjhnedlrfjflslj40a222

CSeq: 85 Subscribe

P-Preferred-Identity: "John Doe" <sip:john.doe@home1.net>

Privacy: none

Expires: 600000

Accept: application/vnd.syncml.ds.notification

Contact: <sip:[5555::aaa:bbb:ccc:ddd]:1357;comp=sigcomp>;q=0.7  Device ID, which differentiates between terminals, with the specified priority of 0.7

FIG. 11

```
NOTIFY sip:[5555::aaa:bbb:ccc:ddd]:1357;comp=sigcomp SIP/2.0

Via: SIP/2.0/UDP psadm1.home1.net;branch=z9hG4bK332b23.1

Max-Forwards: 70

Route: <sip:scscf1.home1.net;lr>, <sip:pcscf1.visited1.net:7531;lr;comp=sigcomp>

From: <sip:john.doe@home1.net>;tag=31415

To: <sip:john.doe@home1.net>;tag=151170

Call-ID: b89rjhnedlrfjflslj40a222

CSeq: 102 NOTIFY

Subscription-State: active;expires=600000        Activating MMS subscription

Event: ua-profile

Contact: <sip:psadm1.home1.net>

Content-Length: 0
```

FIG. 12

| |
|---|
| Subscribe sip:john.doe@home1.net SIP/2.0    User ID |
| Via:                                    SIP/2.0/UDP [5555::aaa:bbb:ccc:ddd]:1357;comp=sigcomp;branch=z9hG4bKnashds7 |
| Max-Forwards: 70 |
| Route: <sip:pcscf1.visited1.net:7531;lr;comp=sigcomp>, <sip:orig@scscf1.home1.net;lr> |
| From: <sip:john.doe@home1.net>;tag=31415 |
| To: <sip:john.doe@home1.net> |
| Accept-Contact: *;+g.oma.icsi.push';+ g.oma.iari.push.PushSyncML;;require;explicit |
| Event:ua-profile: profile-type=oma-app;appid="+g.oma.iari.push.mms.ua"   Subscribing to MMS |
| Call-ID: b89rjhnedlrfjflslj40a222 |
| CSeq: 85 Subscribe |
| P-Preferred-Identity: "John Doe" <sip:john.doe@home1.net> |
| Privacy: none |
| Expires: 600000 |
| Accept: application/vnd.syncml.ds.notification |
| Contact: <sip:[5555::aaa:bbb:ccc:ddd]:1357;comp=sigcomp>;q=0.6   Device ID, which differentiates between terminals, with the specified priority of 0.6 |
| Content-Length: 0 |

FIG. 13

NOTIFY sip:[5555::aaa:bbb:ccc:ddd]:1357;comp=sigcomp SIP/2.0   Device ID, which differentiates between terminals

Via: SIP/2.0/UDP psadm1.home1.net;branch=z9hG4bK332b23.1

Max-Forwards: 70

Route: <sip:scscf1.home1.net;lr>, <sip:pcscf1.visited1.net:7531;lr;comp=sigcomp>

From: <sip:john.doe@home1.net>;tag=31415

To: <sip:john.doe@home1.net>;tag=151170

Call-ID: b89rjhnedlrfjflslj40a222

CSeq: 102 NOTIFY

Subscription-State: active;expires=600000          Activating MMS subscription

Event: ua-profile

Contact: <sip:psadm1.home1.net>

Content-Length: 0

FIG. 14

| | |
|---|---|
| Subscribe sip:john.doe@home1.net SIP/2.0 | User ID |

Via: SIP/2.0/UDP [5555::aaa:bbb:ccc:ddd]:1357;comp=sigcomp;branch=z9hG4bKnashds7

Max-Forwards: 70

Route: <sip:pcscf1.visited1.net:7531;lr;comp=sigcomp>, <sip:orig@scscf1.home1.net;lr>

From: <sip:john.doe@home1.net>;tag=31415

To: <sip:john.doc@home1.net>

Accept-Contact: *;+g.oma.icsi.push';+ g.oma.iari.push.PushSyncML;;require;explicit Event:ua-profile: profile-type=oma-app; appid="app 1;q=0.7, app 2;q=0.6, app 3; q=0.5";

Indicating that 3 services are subscribed to, with the priority ranking from high to low

Call-ID: b89rjhnedlrfjflslj40a222

CSeq: 85 Subscribe

P-Preferred-Identity: "John Doe" <sip:john.doe@home1.net>

Privacy: none

Expires: 600000

Accept: application/vnd.syncml.ds.notification

Contact: <sip:[5555::aaa:bbb:ccc:ddd]:1357;comp=sigcomp>; Device ID, which differentiates between users

Content-Length: 0

FIG. 16

NOTIFY sip:[5555::aaa:bbb:ccc:ddd]:1357;comp=sigcomp SIP/2.0

Via: SIP/2.0/UDP psadm1.home1.net;branch=z9hG4bK332b23.1

Max-Forwards: 70

Route: <sip:scscf1.home1.net;lr>, <sip:pcscf1.visited1.net:7531;lr;comp=sigcomp>

From: <sip:john.doe@home1.net>;tag=31415

To: <sip:john.doe@home1.net>;tag=151170

Call-ID: b89rjhnedlrfjflslj40a222

CSeq: 102 NOTIFY

Subscription-State: active;expires=600000          Activating MMS subscription

Event: ua-profile

Contact: <sip:psadm1.home1.net>

Content-Length: 0

FIG. 17

| |
|---|
| Subscribe sip:john.doe@home1.net SIP/2.0  User ID |
| Via: SIP/2.0/UDP |
| [5555::aaa:bbb:ccc:ddd]:1357;comp=sigcomp;branch=z9hG4bKnashds7 |
| Max-Forwards: 70 |
| Route: <sip:pcscf1.visited1.net:7531;lr;comp=sigcomp>, <sip:orig@scscf1.home1.net;lr> |
| From: <sip:john.doe@home1.net>;tag=31415 |
| To: <sip:john.doe@home1.net> |
| Accept-Contact: *;+g.oma.icsi.push';+ g.oma.iari.push.PushSyncML;;require;explicit |
| Event:ua-profile: profile-type=oma-app; appid="app 2;q=0.7,app 1;q=0.6, app 3; q=0.5"; |
| Indicating that 3 services are subscribed to, with the priority ranking from high to low |
| Call-ID: b89rjhnedlrfjflslj40a222 |
| CSeq: 85 Subscribe |
| P-Preferred-Identity: "John Doe" <sip:john.doe@home1.net> |
| Privacy: none |
| Expires: 600000 |
| Accept: application/vnd.syncml.ds.notification |
| Contact: <sip:[5555::aaa:bbb:ccc:ddd]:1357;comp=sigcomp>  Device ID, which differentiates between terminals, with the specified priority of 0.7 |

FIG. 18

NOTIFY sip:[5555::aaa:bbb:ccc:ddd]:1357;comp=sigcomp SIP/2.0  Device ID, which differentiates between terminals

Via: SIP/2.0/UDP psadm1.home1.net;branch=z9hG4bK332b23.1

Max-Forwards: 70

Route: <sip:scscf1.home1.net;lr>, <sip:pcscf1.visited1.net:7531;lr;comp=sigcomp>

From: <sip:john.doe@home1.net>;tag=31415

To: <sip:john.doe@home1.net>;tag=151170

Call-ID: b89rjhnedlrfjflslj40a222

CSeq: 102 NOTIFY

Subscription-State: active;expires=600000      Activating MMS subscription

Event: ua-profile

Contact: <sip:psadm1.home1.net>

Content-Length: 0

FIG. 19

| | |
|---|---|
| Subscribe sip:john.doe@home1.net SIP/2.0 | User ID |
| Via: | SIP/2.0/UDP |

[5555::aaa:bbb:ccc:ddd]:1357;comp=sigcomp;branch=z9hG4bKnashds7

Max-Forwards: 70

Route: <sip:pcscf1.visited1.net:7531;lr;comp=sigcomp>, <sip:orig@scscf1.home1.net;lr>

From: <sip:john.doe@home1.net>;tag=31415

To: <sip:john.doe@home1.net>

Accept-Contact: *;+g.oma.icsi.push';+ g.oma.iari.push.PushSyncML;;require;explicit Event:ua-profile: profile-type=oma-app;appid="+g.oma.iari.push.mms.ua"   Subscribing to MMS

Call-ID: b89rjhnedlrfjflslj40a222

CSeq: 85 Subscribe

P-Preferred-Identity: "John Doe" <sip:john.doe@home1.net>

Privacy: none

Expires: 600000

Accept: application/vnd.syncml.ds.notification

Contact: <sip:[5555::aaa:bbb:ccc:ddd]:1357;comp=sigcomp>   Device ID, which differentiates between terminals

Content-Length: 0

FIG. 21

```
SIP/2.0 200 OK
Via: SIP/2.0/UDP [5555::aaa:bbb:ccc:ddd]
Via: SIP/2.0/UDP [5555::aaa:bbb:ccc:ddd]
From: <sip:john.doe@home1.net>
To: <sip:john.doe@home1.net>;tag=31415
Call-ID: b89rjhnedlrfjflslj40a222
CSeq: 85 Subscribe
Contact: <sip:[5555::aaa:bbb:ccc:ddd]:1357;comp=sigcomp>
Content-Type: application/sdp
```

FIG. 22

```
NOTIFY sip:[5555::aaa:bbb:ccc:ddd]:1357;comp=sigcomp SIP/2.0    Device ID, which
                                                                differentiates between terminals
Via: SIP/2.0/UDP psadm1.home1.net;branch=z9hG4bK332b23.1
Max-Forwards: 70
Route: <sip:scscf1.home1.net;lr>, <sip:pcscf1.visited1.net:7531;lr;comp=sigcomp>
From: <sip:john.doe@home1.net>;tag=31415
To: <sip:john.doe@home1.net>;tag=151170
Call-ID: b89rjhnedlrfjflslj40a222
CSeq: 102 NOTIFY
Subscription-State: active;expires=600000    Activating MMS subscription
Event: ua-profile
Contact: <sip:psadm1.home1.net>
Content-Length: 0
```

FIG. 23

METHOD, SYSTEM, AND APPARATUS FOR PROCESSING A SERVICE MESSAGE WITH A PLURALITY OF TERMINALS

CROSS-REFERENCE TO RELATED APPLICATION

This application is a continuation of International Application No. PCT/CN2008/073016, filed on Nov. 11, 2008, which claims the priority to Chinese patent application No. 200710169427.4, filed on Nov. 13, 2007, the contents of which are incorporated herein by reference in their entireties.

FIELD OF THE INVENTION

The present invention relates to mobile communication technologies, and in particular, to a method, system, and apparatus for processing a service message with a plurality of terminals of one user.

BACKGROUND OF THE INVENTION

The Push technology is a technology based on a client-server mechanism, in which the server actively sends information to the client. The Push technology is applied in the mobile Value-Added Services (VASs) to transfer relevant contents in time and to help users obtain the contents conveniently. The Push mechanism is a content distribution mechanism, and works in a client-server mode, in which the server distributes the contents desired by the client to the client without receiving a request from the client. FIG. 1 shows a Push service in the prior art. The service is initiated by a server. The Push Initiator (PI) who generates a Push message pushes information and transmits instructions to a Push Proxy Gateway (PPG), and the Push contents are further transmitted to the user by the PPG The system is composed of a PPG, a PI, and a terminal. The PPG obtains messages from the Push server through a Password Authentication Protocol (PAP), and sends the contents to a Wireless Application Protocol (WAP) user through a Push-Over The Air (OTA) protocol. The PI sends the Push contents and a transfer command to the PPG, and the PPG transfers the Push contents to the terminal according to the transfer command.

FIG. 2 shows a Session Initiation Protocol (SIP) Push service in the prior art. A SIP Push service is a Push OTA over SIP service defined by the Open Mobile Alliance (OMA), in which the Push OTA contents are encapsulated into a SIP message and transferred through the existing SIP/IP core network. SIP is an application-layer protocol for setting up a multimedia session between two or more participants. The PPG and the client act as interface points of the SIP/IP core network. In the SIP Push process, SIP can provide these functions: user reachability, user availability, user capabilities, session setup, and session management.

The SIP/IP core network provides plentiful end-to-end media sessions and sessions between the client and the server. The SIP/IP core network includes a SIP gateway and a registration server, provides the SIP client with service authentication and authorization, and provides SIP registration and routing functions. The PPG and the Push client are interface points to the SIP/IP core in function.

The SIP-based event subscription mechanism or the SIP event framework defines permission of notifying asynchronous events in the subscription process. After the initial registration, the Push client should send a SUBSCRIBE request to the PPG. If the Push client needs to subscribe to a Push event for a specific Push service, for example, transfer client capability information or subscribe to a specific event, the PPG and Push client are expected to support the SUBSCRIBE method and the NOTIFY method. Especially, the Push client should support the SUBSCRIBE function for specific Push contents, and support receiving of Push contents. The PPG should support the NOTIFY function, through which the SUBSCRIBE request is received from the Push client and the Push information is sent to the client.

A user ID is a public user identity. One or more public user identities are allocated for one user to use the network. When the user requests to communicate with another user, the user uses the public user identity. One user may have different appearances. Each appearance includes different public user identities. The format of a public user identity is a hierarchical SIP Uniform Resource Identifier (URI). The SIP URI may be constructed through a telephone number or a host name (such as SIP:user@company.com). SIP URIs are similar to email addresses, and therefore, easily correlated with email addresses of the user.

However, when a user has many terminals such as computers, 2G terminals or 3G terminals, the home network allocates a device ID to each terminal. The device ID controls uniqueness of each terminal in a network. For example, the device ID is used for authentication, authorization, and management.

The Push client may send a SUBSCRIBE request to update the subscription and declare available applications and versions through an "appid" parameter.

When the Push client subscribes to only one application, for example, "app 1" which is a Multimedia Message Service (MMS), the SUBSCRIBE request is as follows:

SUBSCRIBE sip user-aor@example.com SIP/2.0

Event: ua-profile; profile-type=oma-app; appid="+g.oma.iari.Push.mms.ua";

When the Push client subscribes to multiple applications, for example app 1, app 2, app 3, the SUBSCRIBE request is as follows:

SUBSCRIBE sip user-aor@example.com SIP/2.0

Event: ua-profile; profile-type=oma-app; appid="app 1, app 2, app 3";

If the Push client subscribes to app 1, app 2 and app 3 but the PPG supports only app 1 and app 2, then the NOTIFY message returned by the PPG includes only two parameters: app 1 and app 2, indicating that the two application services are subscribed to successfully. The SUBSCRIBE request and the NOTIFY message are as follows:

SUBSCRIBE sip:user-aor@example.com SIP/2.0

Event: ua-profile; profile-type=oma-app; ppid="app 1,app 2,app 3";

NOTIFY

Event: ua-profile; profile-type=oma-app; appid="app 1,app 2";

If a user has subscribed to the MMS, an MMS notification is sent to the terminal of the user once the PPG has an MMS destined for the terminal. The notification indicates that the user has an incoming MMS message and the user can retrieve it from the PPG. The user may set the terminal to retrieve MMS messages and store them on the terminal automatically, or the user retrieves the messages at convenient time after receiving the MMS notification.

In the SIP Push services, currently the same user may have a plurality of terminals. For example, a user has a 2G mobile phone, a 3G mobile phone, a desktop computer, and a notebook computer at the same time. The PPG stores the public user identity to identify the user. The PPG also stores the device addresses of the terminals for identifying the terminals so as to send the calls or messages destined for each device. The PPG also stores information about specific services that each terminal subscribes to.

When any service subscribed to by a plurality of terminals arrives, all terminals may receive the service. The services available for subscription include: MMS, Short Message Service (SMS), email notification, and device management. There is a scenario: When the PPG sends an MMS message to the user through the SIP/IP core network, each user terminal that has subscribed to the MMS receives a notification of the MMS message.

FIG. 3 is a flowchart of MMS communication when a user has a plurality of terminals in the prior art. When a user has a first terminal, a second terminal and a third terminal at the same time, the Multimedia Message Service Center (MMSC) is a PI, and the PPG is a PPG. The flow includes the following steps:

Step S301: The MMSC has an MMS notification message destined for the user, and sends the MMS notification to the PPG. After receiving the MMS notification, the PPG finds that the user has three terminals, and therefore, forwards the notification to the three terminals respectively.

Step S302: The user sets automatic retrieval of the notified MMS message, and therefore, the three terminals send a Hyper Text Transfer Protocol (HTTP) GET message to the MMSC PPG respectively, requesting to retrieve the MMS message.

Step S303: After receiving the GET message from the first terminal, the PPG sends an HTTP 200 OK response which carries the MMS message to the first terminal.

Step S304: The MMSC PPG deletes the MMS message that has been retrieved by the first terminal, and the second terminal and the third terminal receive an HTTP 4xx error response returned by the MMSC. The MMS notification may also be forwarded by the SIP/IP core network to the three terminals.

In the process of implementing the present invention, the inventor finds at least the following defects in the prior art:

Each terminal of the user receives the same MMS notification, which leads to a waste of resources and increases the network transmission load; moreover, the user has to receive the same information repeatedly. Even worse, the MMSC is unaware how many terminals are currently held by the user. After the MMSC sends a notification, the PPG or the SIP/IP core network forwards the notification to each terminal of the user. If the user sets automatic retrieval of the MMS message from the PPG, only one terminal can retrieve the MMS message successfully; the remaining terminals fail to retrieve the message, or the MMSC tells the user that the message does not exist or has been retrieved. Consequently, the user experience is deteriorated.

SUMMARY OF THE INVENTION

A method, system, and apparatus for processing a service message with a plurality of terminals of a user are provided in embodiments of the present invention to overcome these defects in the prior art: The PPG sends a service message to all terminals that have the same user ID, and consequently, the resources are wasted, the network transmission load is increased, and the user experience is deteriorated.

To achieve the foregoing objectives, a method for processing a service message with a plurality of terminals of one user is provided in an embodiment of the present invention. The method includes: receiving a request message from a plurality of terminals of a same user identifier, ID, wherein the request message carries request information comprising a user ID, a device ID, or an application ID; and sending a service message to one terminal of the plurality of terminals of the same user ID according to the request information.

Further, a system for processing a service message with a plurality of terminals of one user is provided in an embodiment of the present invention. The system includes a PPG and at least two terminals that have the same user ID. The terminal is configured to send a request message to the PPG, where the request message carries request information of the terminal. The PPG is configured to receive the request message from the terminals, and send a service message to one terminal of the two terminals according to the request information.

Further still, a PPG is provided in an embodiment of the present invention. The PPG includes: a request receiving module, configured to receive a request message from a plurality of terminals of a same user identifier, ID, wherein the request message carries request information comprising a user ID, a device ID, or an application ID; and a processing module, configured to send a service message to one terminal of the plurality of terminals of the same user ID according to the request information.

Compared with the prior art, the technical solution under the present invention provides the following benefits:

The PPG needs to send only the corresponding service message to a specific terminal according to the request information sent by the terminal rather than send the service message to all terminals. Therefore, it is not necessary for a plurality of terminals of the same user to receive the same service message repeatedly, and the waste of resources is avoided.

BRIEF DESCRIPTION OF THE DRAWINGS

FIG. 5 shows a schematic diagram of a SUBSCRIBE request sent by a user in one embodiment of the present invention;

FIG. 6 shows a schematic diagram of a 200 OK message in one embodiment of the present invention;

FIG. 7 shows a schematic diagram of an activation indication of service subscription in one embodiment of the present invention;

FIG. 8 shows a schematic diagram of a request of a second terminal in one embodiment of the present invention;

FIG. 11 shows a schematic diagram of a SUBSCRIBE request sent by a user in another embodiment of the present invention;

FIG. 12 shows a schematic diagram of activation of MMS subscription in another embodiment of the present invention;

FIG. 13 shows a schematic diagram of subscription by a second terminal in another embodiment of the present invention;

FIG. 14 shows a schematic diagram of activation of service subscription in another embodiment of the present invention;

FIG. 16 shows a schematic diagram of a SUBSCRIBE request sent by a first terminal to a PPG in another embodiment of the present invention;

FIG. 17 shows a schematic diagram of an activation indication in another embodiment of the present invention;

FIG. 18 shows a schematic diagram of subscription by a second terminal in another embodiment of the present invention;

FIG. 19 shows a schematic diagram of activation of service subscription by the second terminal in another embodiment of the present invention;

FIG. 21 shows a schematic diagram of a SUBSCRIBE request sent by a user in another embodiment of the present invention;

FIG. 22 shows a schematic diagram of a 200 OK message in another embodiment of the present invention;

FIG. 23 shows a schematic diagram of activation of service subscription in another embodiment of the present invention;

DETAILED DESCRIPTION OF THE INVENTION

The embodiments of the present invention are detailed below with reference to accompanying drawings.

The embodiments of the present invention deal with how to receive the same message in a Push mechanism with a plurality of terminals. Multiple solutions are put forward herein: In the subscription process, the SIP Push requires only one terminal to be able to subscribe to specific services, or priorities need to be set for specific services in the subscription. In this way, when the PPG has a specific service message sent to the user with a plurality of terminals, the terminal of the corresponding device ID rather than all terminals is selected to receive the service message. Therefore, the waste of network resources is avoided; it is not necessary for a plurality of terminals of one user to receive the same message repeatedly; and the receiving of other services is not affected by the repeated receiving of the same message. Depending on the specific services, the implementation falls into the following modes:

1. In the subscription process, among all terminals of one user, only one terminal is allowed to subscribe to a service. That is, if the current terminal has subscribed to a service, when another terminal of the user requests to subscribe to the same service, the PPG notifies the terminal that the service is not available because it has been subscribed to.

2. After the first terminal subscribes to a service successfully, a notification is sent to other terminals to indicate that the service has been subscribed to. In this way, repeated subscription is avoided, and a service is subscribed to by only one terminal.

3. All terminals are allowed to subscribe to a service. In the subscription process, priorities are set for the terminals. The priority policy is stored on the PPG, and the PPG controls the message distribution. Therefore, when this service arrives, only one terminal receives the service message first, and other terminals do not receive the service message at the same time.

4. All terminals are allowed to subscribe to a service. The PPG sets the priorities for the terminals. According to the network conditions, the PPG selects a terminal for receiving the service message, and other terminals do not receive the message at the same time.

The user information, terminal information, or service subscription information may be sent to the PPG through a REGISTER request and/or a SUBSCRIBE request.

Taking the SUBSCRIBE request as an example, the embodiments of the present invention in the foregoing modes are detailed below. The message that carries request information is not limited to the SUBSCRIBE request. Other messages capable of this function are covered in the scope of protection of the present invention.

One Embodiment

Figure 1:
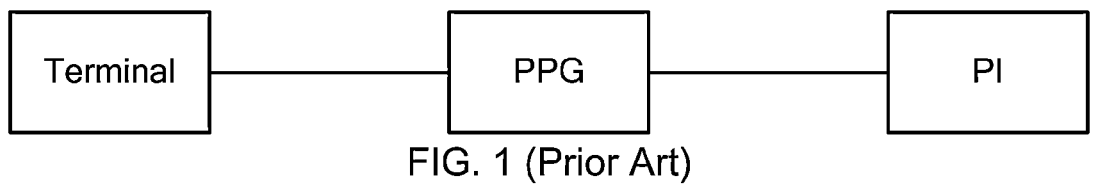
FIG. 1 is a schematic diagram of a Push service in the prior art.
Figure 2:
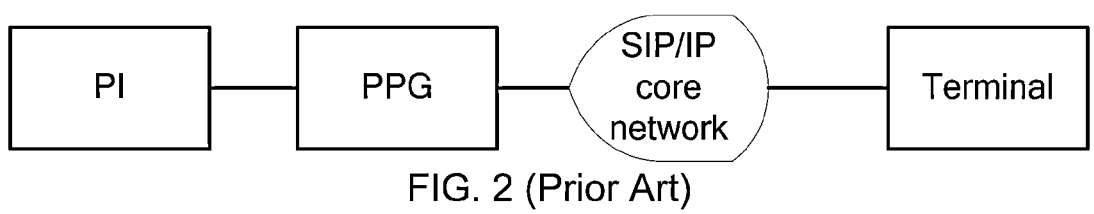
FIG. 2 is a schematic diagram of a SIP Push service in the prior art.
Figure 3:
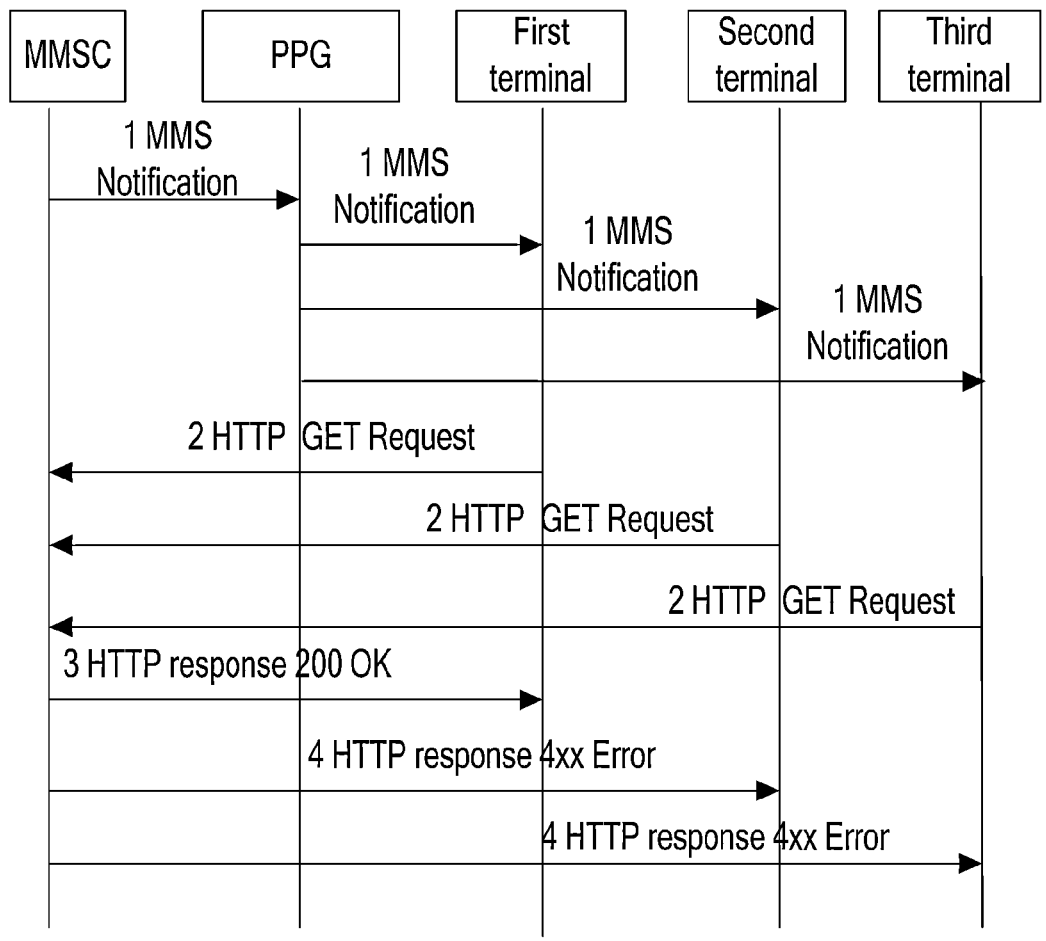
FIG. 3 is a flowchart of MMS communication when a user has a plurality of terminals in the prior art.
Figure 4:
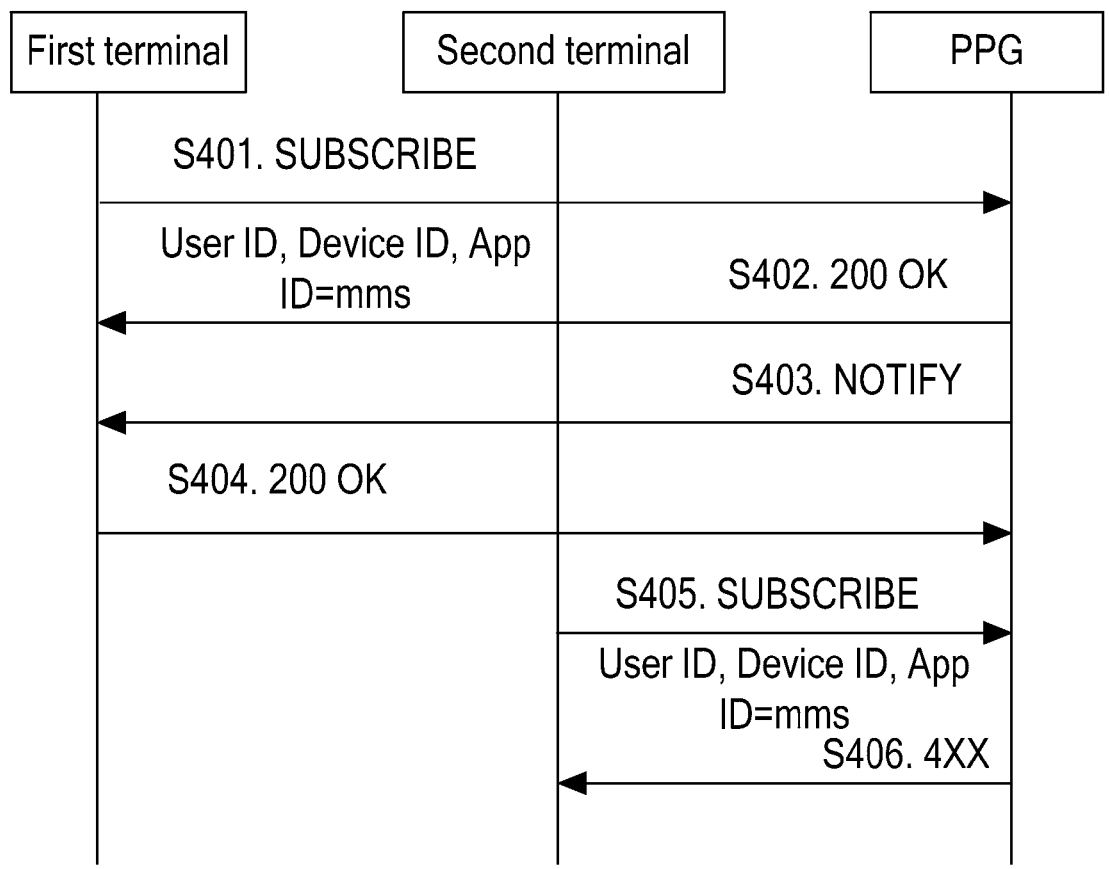
FIG. 4 is a flowchart of sending a service subscription request in one embodiment of the present invention.

FIG. 4 is a flowchart of sending a service subscription request in one embodiment of the present invention. The first terminal and the second terminal are two different devices of the same user. In this embodiment, only one terminal is allowed to subscribe to a service. That is, if the current terminal has subscribed to a service, when another terminal of the user requests to subscribe to the same service, the PPG notifies the terminal that the service is not available because it has been subscribed to. Different terminals of a user may be differentiated by an International Mobile Subscriber Identity (IMSI), a private user ID (Identity), a Globally Routable User Agent URI (GRUU), multiple contact information, an IP address, a telephone number, or a device number. The detailed steps are as follows:

Step S401: In this embodiment, taking the user "john.doe@home1.net" as an example, the first terminal of the user "john.doe@home1.net" sends a SUBSCRIBE request to the PPG. This request carries the user ID, device ID, and the application ID, and is intended to subscribe to an MMS service.

FIG. 5 shows a SUBSCRIBE request sent by a user in the embodiment of the present invention. First, the PPG identifies the user ID, device ID, and application ID of the user. After such IDs are identified as correct, the first terminal sends a request for subscribing to an MMS service to the PPG. After the request is accepted, the device ID is written into the database. This device ID may differentiate between terminals.

Step S402: After the SIP SUBSCRIBE request of the "ua_profile" event package is received, the PPG authenticates the identity of the initiator, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the first terminal. The 200 OK message in this step is shown in FIG. 6.

Step S403: The PPG generates and sends an initial SIP NOTIFY message, which carries an empty body and indicates that the service subscription is activated. FIG. 7 shows an activation indication of service subscription in the embodiment of the present invention. To validate the subscribed MMS service, the subscription to the MMS service needs to be activated in this step.

Step S404: The Push client on the first terminal responds with a 200 OK message.

When the PPG receives the service request, the PPG submits a Push content by adding the Push content to a SIP NOTIFY message. The SIP NOTIFY message is sent to the terminal that sends the service request.

Step S405: The second terminal of the user sends a request for subscribing to the MMS service. The public user identity of the second terminal is "john.doe@home1.net" and the device ID of the second terminal is different from that of the first terminal. FIG. 8 shows a request of a second terminal in the embodiment of the present invention. This step differs from step S401 in the used device. That is, the device ID is different. The device ID identifies the device that sends the request.

Step S406: The PPG finds that the public user identity of the user is also "john.doe@home1.net", that the subscribed service is also MMS, and that the user has subscribed to the MMS service through another device. Therefore, the PPG returns a 4XX response, indicating that the service is not available because it has been subscribed to successfully.

The first terminal of the user has subscribed to the MMS service from the PPG

Therefore, the PPG determines that the user has subscribed to the MMS service, and returns a 4XX response to the second terminal of the user.

An optional step in this embodiment is that: After the first terminal subscribes to the service successfully, the PPG sends a NOTIFY message to all registered terminals, indicating that the service has been subscribed to successfully and needs no further subscription. The addresses of other terminals may be stored in the PPG or the SIP/IP core network and bound to the user at the time of registering each terminal. Through such addresses, the messages can be notified to all terminals of the user.

Figure 9:
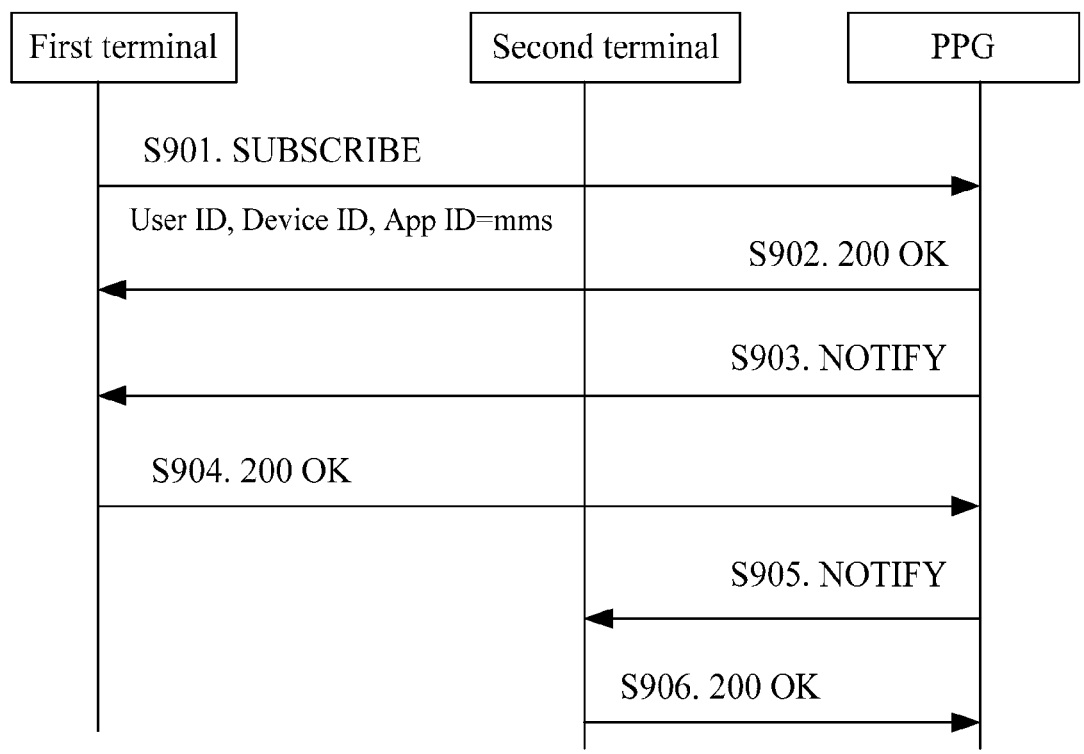
FIG. 9 is a flowchart of optional steps in one embodiment of the present invention.

FIG. 9 is a flowchart of optional steps in the embodiment of the present invention, as detailed below:

Step S901: The first terminal of the user "john.doe@home1.net" sends a SUBSCRIBE request to the PPG. This request carries the user ID, device ID, and the application ID, and is intended to subscribe to an MMS service.

Step S902: After the SIP SUBSCRIBE request of the "ua_profile" event package is received, the PPG checks the identity of the initiator, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the first terminal.

Step S903: The PPG generates and sends an initial SIP NOTIFY message, which carries an empty body and indicates that the service subscription is activated.

Step S904: The Push client on the first terminal responds with a 200 OK message.

Step S905: The PPG sends a NOTIFY message to other terminals. The header field or the body of the NOTIFY message carries information indicating that the MMS service is subscribed to by the first terminal successfully and is unavailable to other terminals.

Step S906: Other terminals return a 200 OK message, indicating that the request is accepted.

In the subscription process in this embodiment, the SIP Push mechanism allows only one terminal to subscribe to specific services. Therefore, when the PPG has a specific service message sent to the user, only this allowed terminal instead of all devices of the user is able to receive the message, thus avoiding waste of network resources.

Another Embodiment

Figure 10:
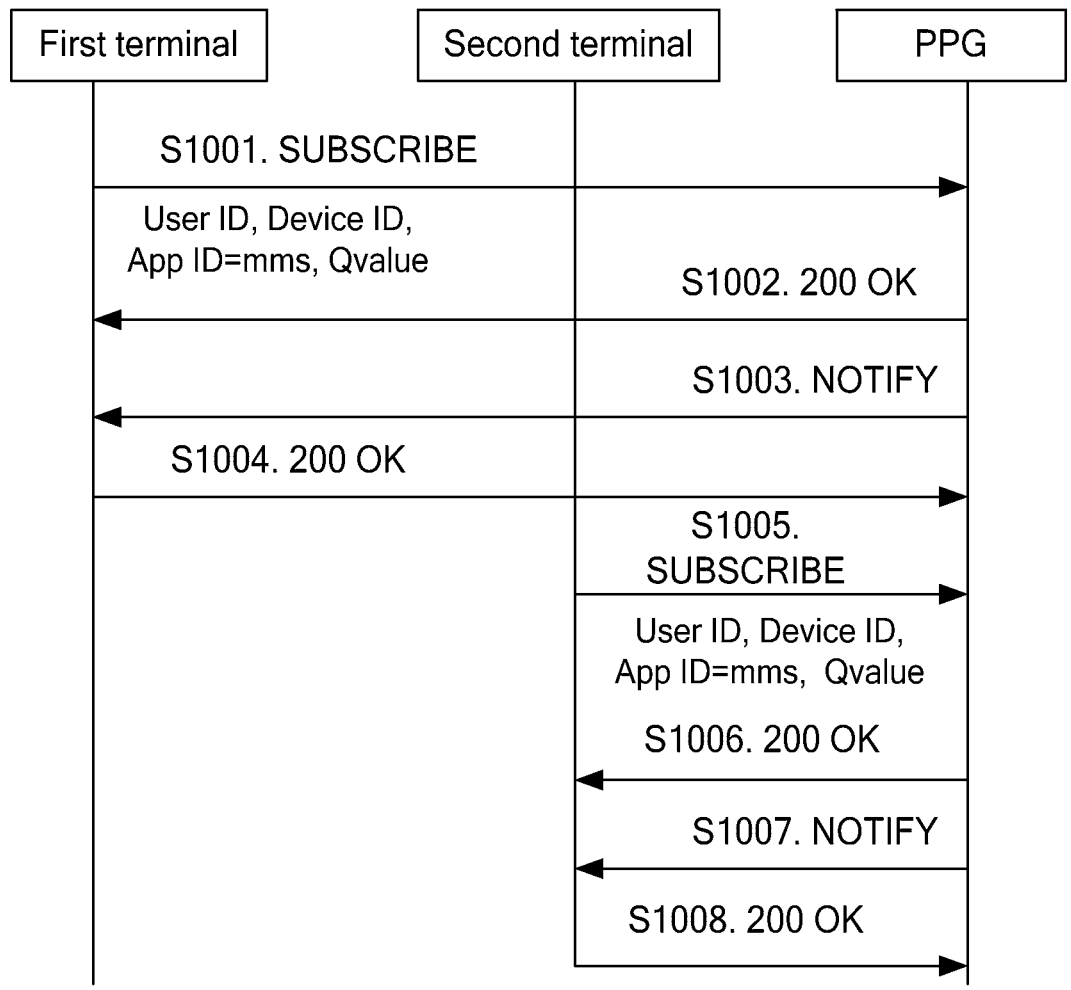
FIG. 10 is a flowchart of subscribing to only one service with a SUBSCRIBE request in another embodiment of the present invention.

FIG. 10 is a flowchart of command transmission when a SUBSCRIBE request is intended to subscribe to only one service in the embodiment of the present invention. The first terminal and the second terminal given in this embodiment are two different devices of the same user. When the first terminal sends a request for subscribing to a service to the PPG, the first terminal is identified by a public user ID and a private user ID, and the request carries a priority parameter "Qvalue". The priority parameter indicates that: For a subscribed service, the PPG sends the service to the terminal of the highest priority; if the service is sent successfully, the PPG does not send the service to a second terminal any more; if the service is sent unsuccessfully, the PPG sends the service to the terminal of the next priority, and so on.

In the service implementation, the terminal submits a priority list to the PPG when sending the SUBSCRIBE request. Therefore, the terminal desired by the user receives the service message first. A higher Qvalue indicates higher importance of the given position. The range of the Qvalue may be 0-1.

Different terminals of a user may be differentiated by an IMSI, a private user ID, a GRUU, multiple contact information, an IP address, a telephone number, or a device number. This embodiment is implemented through two solutions. When the SUBSCRIBE request is a request for subscribing to only one service (namely, only one application ID exists), the steps are as follows:

Step S1001: The first terminal of the user "john.doe@home1.net" sends a SUBSCRIBE request to the PPG. This request carries a user ID, a device ID, a Qvalue parameter, and an application ID, and is intended to subscribe to an MMS service. The request indicates that the first terminal of the user has the highest priority in receiving the MMS service. When a service arrives, the service is sent to this terminal first. FIG. 11 shows a SUBSCRIBE request message sent by a user in the embodiment of the present invention. First, the user is identified; then the MMS service is subscribed to; and finally, a priority is set at "CONTACT:". In this embodiment, the set priority is 0.7(Contact:<sip:[5555::aaa:bbb:ccc:ddd]:1357;comp=sigcomp>;q=0.7). Through such priority setting, the service message may be sent to a selected terminal.

Step S1002: After the SIP SUBSCRIBE request of the "ua_profile" event package in FIG. 10 is received, the PPG authenticates the identity of the initiator, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the first terminal.

Step S1003: The PPG generates and sends an initial SIP NOTIFY message, which carries an empty body and indicates that the service subscription is activated. The priority information of other terminals may also be notified to the first terminal through a Contact header field. FIG. 12 shows activation of MMS subscription in the embodiment of the present invention.

Step S1004: The Push client on the first terminal responds with a 200 OK message.

When the PPG receives the service request, the PPG submits a Push content by adding the Push content to a SIP NOTIFY message sent to the Push client in the subscription process.

Step S1005: The second terminal may also subscribe to the MMS service, and send a SUBSCRIBE request to the PPG. This request carries a user ID, a device ID, a Qvalue parameter, and an application ID, and is intended to subscribe to the MMS service. The request indicates that the second terminal of the user has the priority next to the highest priority in receiving the MMS service. When a service arrives, the service is sent to the second terminal if the first terminal fails to receive the service normally. FIG. 13 shows subscription by the second terminal in an embodiment of the present invention. The priority set in the second terminal is: (Contact:<sip: [5555::aaa:bbb:ccc:ddd]:1357;comp=sigcomp>;q=0.6). In this embodiment, the set priority is 0.6. The priority of the second terminal is lower than that of the first terminal. Therefore, when the first terminal fails to receive the service message normally, the terminal of the second priority is selected for receiving the service message.

Step S1006: After the SIP SUBSCRIBE request of the "ua_profile" event package is received, the PPG authenticates the identity of the initiator, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the second terminal.

Step S1007: The PPG generates and sends an initial SIP NOTIFY message, which carries an empty body and indicates that the service subscription is activated. FIG. 14 shows activation of service subscription in the embodiment of the present invention. In this step, the subscribed MMS service is activated. The priority information of other terminals may be notified to the second terminal through a Contact header field.

Step S1008: The Push client on the second terminal responds with a 200 OK message.

Another Embodiment

Figure 15:
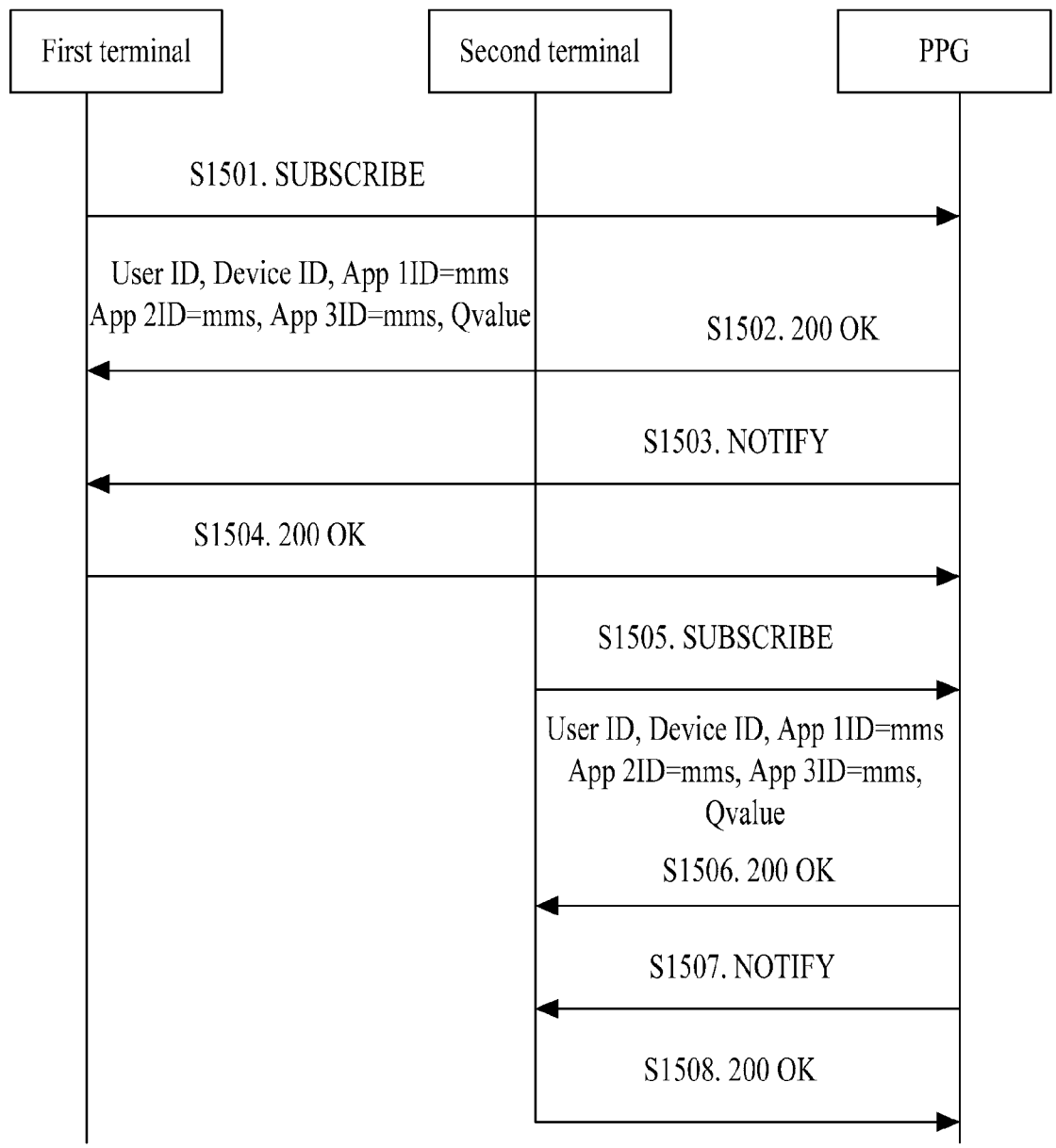
FIG. 15 is a flowchart of subscribing to multiple services with a SUBSCRIBE request in another embodiment of the present invention.

FIG. 15 is a flowchart when a SUBSCRIBE request is intended to subscribe to multiple services in the embodiment of the present invention. Multiple application IDs are involved in this embodiment, and the user "john.doe@home1.net" is taken as an example here. The detailed steps are as follows:

Step S1501: The first terminal of the user "john.doe@home1.net" sends a SUBSCRIBE request to the PPG. This request carries a user ID, a device ID, a Qvalue parameter, and multiple application IDs, and is intended to subscribe to multiple services. The request indicates that the first terminal of the user has the highest priority in receiving the App 1 service. When an App 1 service arrives, the App 1 service is sent to the first terminal first. App 2 is the second preferred service of the first terminal, and App 3 is the third preferred service of the first terminal. FIG. 16 shows a SUBSCRIBE request sent by a first terminal to a PPG in the embodiment of the present invention. Three different priority values exist in the APP field: appid="app 1; q=0.7, app 2; q=0.6, app 3; q=0.5, arranged from high to low. Through the priority, the PPG knows which service is preferred by the terminal, and may send the service of a higher priority to the terminal. After the service of the higher priority is sent, the PPG may send the service of the lower priority.

Step S1502: After the SIP SUBSCRIBE request of the "ua_profile" event package is received, the PPG authenticates the identity of the initiator, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the first terminal.

Step S1503: The PPG generates and sends an initial SIP NOTIFY message, which carries an empty body and indicates that the service subscription is activated. FIG. 17 shows an indication of activation in the embodiment of the present invention. The message may indicate to the first terminal whether the subscription to each service is activated.

Step S1504: The Push client on the first terminal responds with a 200 OK message. When the PPG receives the service request, the PPG submits a Push content by adding the Push content to a SIP NOTIFY message sent to the Push client in the subscription process.

Step S1505: The second terminal sends a SUBSCRIBE request to the PPG This request carries a user ID, a device ID, a Qvalue parameter, and multiple application IDs, and is intended to subscribe to multiple services. The request indicates that this terminal of the user has the highest priority in receiving the app 2 service. When an app 2 service arrives, the app 2 service is sent to the second terminal first. App 1 is the second preferred service of the second terminal, and App 3 is the third preferred service of the second terminal. FIG. 18 shows subscription by the second terminal in the embodiment of the present invention. First, the user is identified. After the user ID, the Device ID, and the Qvalue parameter are identified as correct, a priority needs to be written into each subscribed service. In this embodiment, the highest priority of APP2 is 0.7, and the device ID is written last. In this step, the device is the second terminal.

Step S1506: After the SIP SUBSCRIBE request of the "ua_profile" event package is received, the PPG authenticates the identity of the second terminal, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the second terminal.

Step S1507: The PPG generates and sends an initial SIP NOTIFY message, which carries an empty body and indicates that the service subscription is activated. The priority information of other terminals may also be notified to the second terminal through a Contact header field. FIG. 19 shows activation of service subscription by the second terminal in the embodiment of the present invention. If it is necessary to notify the priority information of other terminals to the second terminal, the priority information of other terminals may be added before the Contact header field.

Step S1508: The Push client on the second terminal responds with a 200 OK message.

In this embodiment, a priority is set. At the time of subscribing to a service, if the terminal of a higher priority fails to receive the service, the terminal of a lower priority may receive the service instead, and it is impossible for two terminals to receive the same service at the same time. Therefore, a plurality of terminals of a user never receive the same message repeatedly, and the receiving of other services is never affected by arrival of the same message.

Another Embodiment

Figure 20:
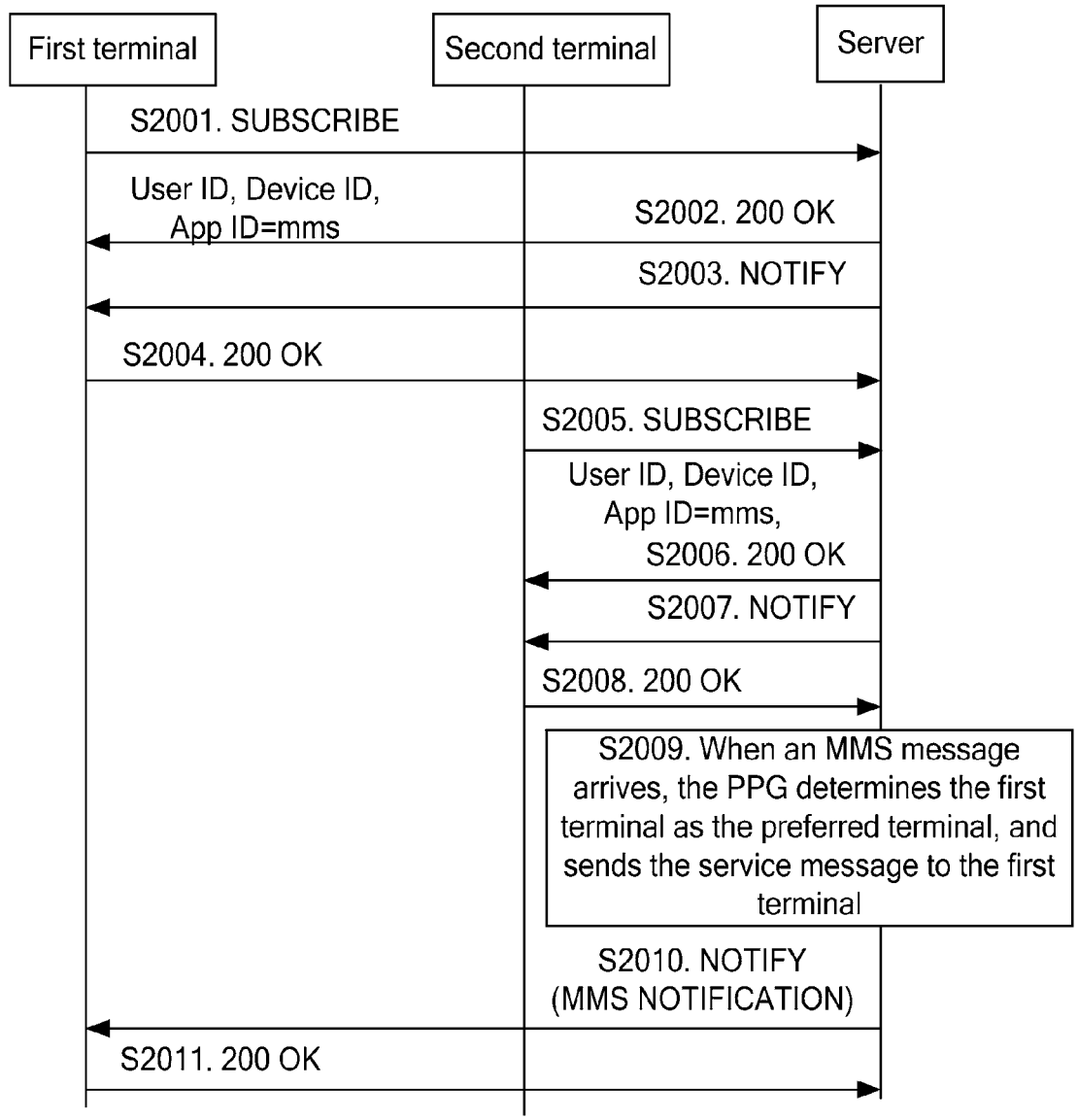
FIG. 20 is a flowchart illustrating how a PPG selects a higher-priority device to receive a service in a another embodiment of the present invention.

FIG. 20 is a flowchart illustrating how a PPG selects a higher-priority device to receive a service in the embodiment of the present invention. All terminals of a user in this embodiment are allowed to subscribe to the same service. The PPG sets the priorities for the terminals. According to the network conditions, the PPG selects a terminal for receiving the service message, and other terminals do not receive the message at the same time. All terminals of the user may use a public user ID to send a request for subscribing to the service to the PPG, where the request carries a private user ID (which may be a contact address). The PPG returns a response, indicating that the subscribed service is activated for all terminals of the user. Different terminals of a user may be differentiated by an IMSI, a private user ID, a GRUU, or multiple contact information, an IP address, a telephone number, or a device number. The detailed steps are as follows:

Step S2001: In this embodiment, taking the user "john.doe@home1.net" as an example, the first terminal of the user "john.doe@home1.net" sends a SUBSCRIBE request to the PPG. This request carries the user ID, device ID, and the application ID, and is intended to subscribe to an MMS service. FIG. 21 shows a SUBSCRIBE request message sent by a user in the embodiment of the present invention. First, the user is identified. After the user ID is authenticated as correct, the MMS service is subscribed to. Finally, the device ID of the terminal is added, indicating that the terminal has subscribed to the service.

Step S2002: After the SIP SUBSCRIBE request of the "ua_profile" event package is received, the PPG checks the identity of the initiator, and judges whether the user is allowed to subscribe to the service through the current device according to the local rules. If the authentication succeeds, the PPG creates a subscription session of the "ua_profile" event package, and provides a method for identifying the data change according to the "Event" header field parameter, and then returns a 200 OK message to the first terminal. FIG. 22 shows a 200 OK message in the embodiment of the present invention.

Step S2003: The PPG generates and sends an initial SIP NOTIFY message, which carries an empty body and indicates that the service subscription is activated. FIG. 23 shows activation of service subscription in the embodiment of the present invention.

Step S2004: The Push client on the first terminal responds with a 200 OK message. When the PPG receives the service request, the PPG submits a Push content by adding the Push content to a SIP NOTIFY message sent to the Push client in the subscription process.

Steps S2005-S2008: The second terminal subscribes to the MMS service from the PPG. First, the user ID is checked, and the MMS service is subscribed to, and then the device ID is written. Finally, the MMS service subscription is activated.

Step S2009: When an MMS message sent to the user arrives, the PPG selects the preferred terminal of the user according to the set selection criteria, and sends the service message to the selected terminal. It is assumed that the preferred terminal is the first terminal.

The PPG judges the preference of the terminal automatically according to the priority of the terminal device. Generally, the priority depends on the network quality. The PPG may select the terminal of better network quality so that the user can obtain a better information service. In this embodiment, the first terminal is the preferred terminal, and the user obtains the information service through the first terminal.

Step S2010: A service message is sent to the first terminal through a NOTIFY message.

Step S2011: The first terminal returns a 200 OK message, indicating that the message is received successfully.

Another Embodiment

Figure 24:
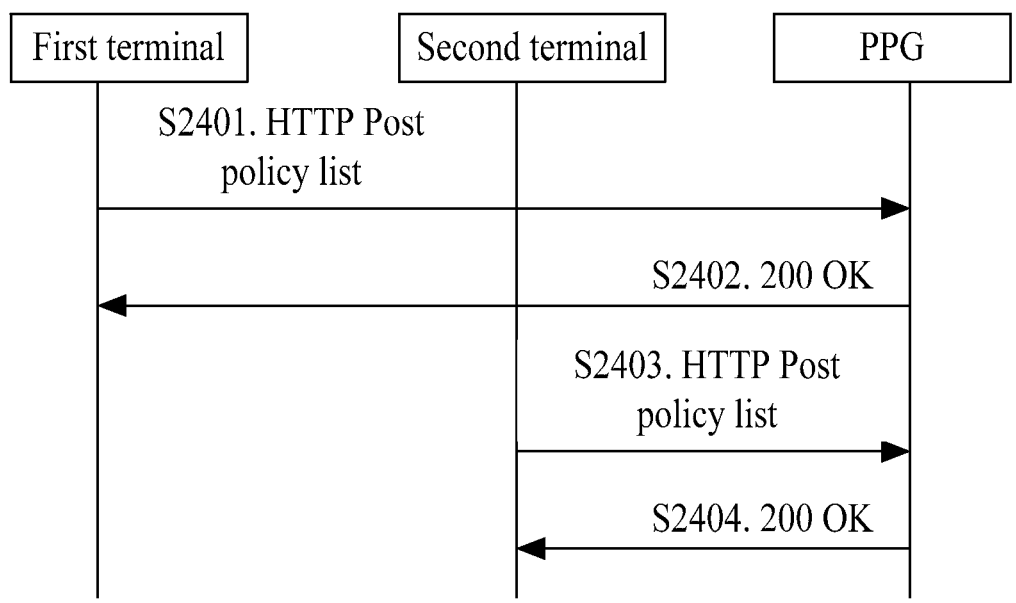
FIG. 24 is a flowchart of sending a service request to a PPG through HTTP in another embodiment of the present invention.

FIG. 24 shows a flowchart of sending a service request to a PPG through HTTP in the embodiment of the present invention. It is assumed that the terminal sends a request to the PPG to notify the PPG of the services that the terminal expects to receive. In the second solution of this embodiment, the terminal sends a service receiving priority list set by the terminal to the PPG through HTTP, as detailed below:

Step S2401: The user uses the first terminal to set a list of HTTP Post policies for receiving services.

The policy list may be a priority list. This priority list may indicate the services preferred by the terminal. In the second solution of the embodiment, the MMS service is taken as an example. That is, the first terminal expects to receive the MMS service first.

Step S2402: The PPG returns a 200 OK message, indicating that the PPG has received the HTTP Post policy list from the terminal.

Step S2403: The user uses the second terminal to set a list of HTTP Post policies for receiving services.

Like the first terminal, the second terminal may indicate that the second terminal expects to receive the email notification service first in this embodiment.

Step S2404: The returns a 200 OK message, indicating that the PPG has received the HTTP Post policy list from the terminal.

In this embodiment, the priority of the terminal is set, or an HTTP-based service receiving policy list is set. The terminal of a higher priority is selected for providing a higher-priority information service for the user. When a service message is sent, other terminals do not receive the service message at the same time. Therefore, the quality of service is improved, and repeated data transmission is avoided. The PPG in this embodiment may be another server capable of this function.

System Embodiment

Figure 25:
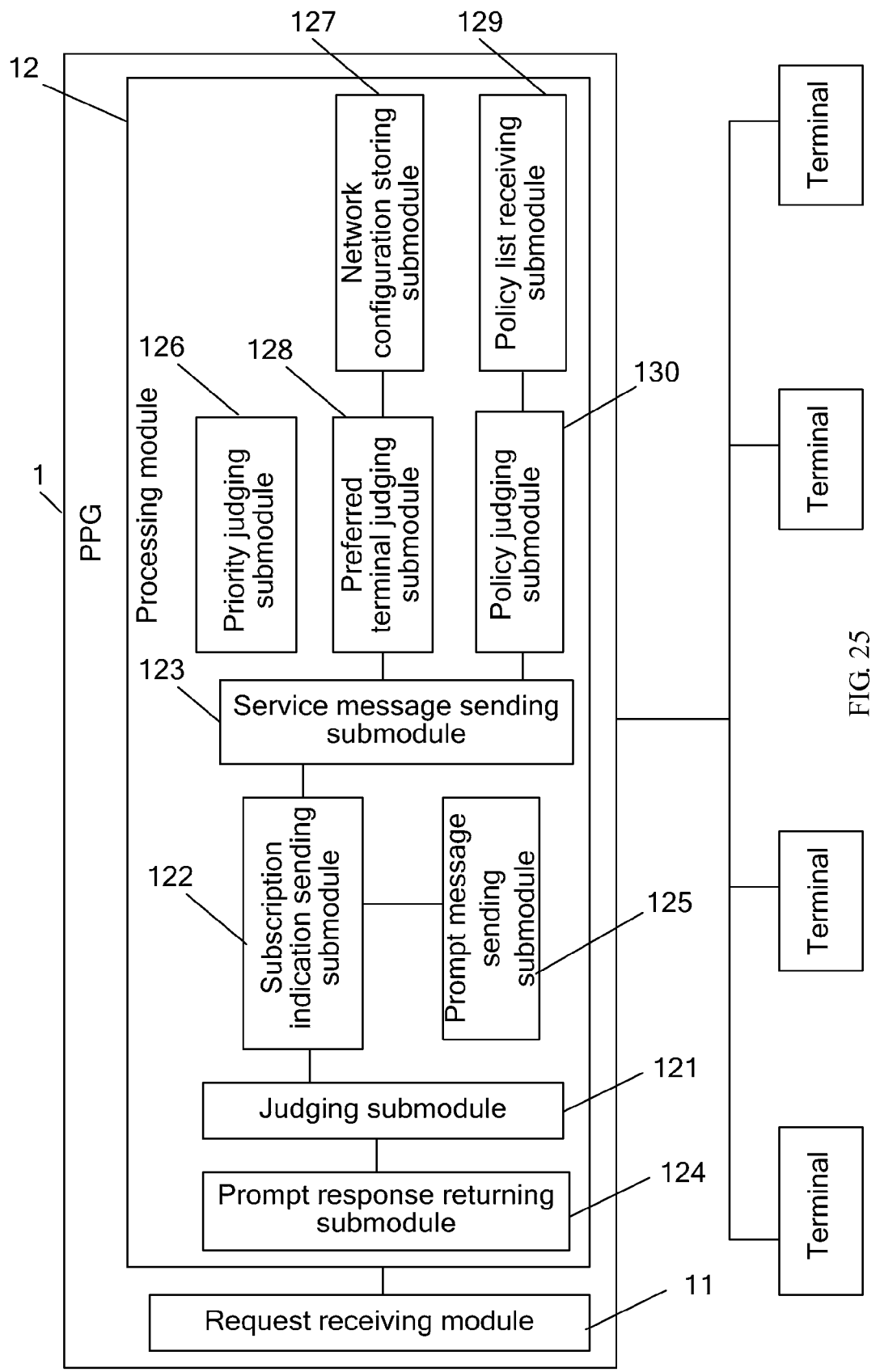
FIG. 25 shows a structure of a system for processing service messages with a plurality of terminals of one user in another embodiment of the present invention.

FIG. 25 shows a structure of a system for processing service messages with a plurality of terminals of one user in an embodiment of the present invention. This system includes a PPG 1 and at least two terminals 2 which have the same user ID. Terminals 2 are configured to send a SUBSCRIBE request to the PPG 1. The SUBSCRIBE request carries request information of the terminals. The PPG 1 is configured to: receive the SUBSCRIBE request from the terminal 2, and send a service message to the terminal 2 according to the request information. The request information includes a user ID, a device ID, and an application ID.

The PPG 1 includes: The PPG 1 includes a request receiving module 11, configured to receive a SUBSCRIBE request from the terminal 2, where the SUBSCRIBE request carries request information of the terminal 2; and a processing module 12, configured to send a service message to the terminal 2 according to the request information when a service arrives.

The processing module 12 includes: a judging submodule 121, configured to judge whether the service requested by the terminal 2 has been requested by the terminal of the same user ID according to the user ID and the application ID in the request information; a subscription indication sending submodule 122, configured to send an activation indication of service subscription to the terminal 2 if the judging submodule 121 determines that no terminal of the same user ID has requested the service; and a service message sending submodule 123, configured to send a service message to the terminal 2 when a service arrives.

The processing module 12 further includes a prompt response returning submodule 124, which is configured to return a prompt response indicative of the subscribed state of the service to the terminal 2 if the judging submodule 121 determines that a terminal of the same user ID has requested the service.

The processing module 12 further includes a prompt message sending submodule 125. The prompt message sending submodule 125 is configured to: send a NOTIFY message to other terminals that have the same user ID as the terminal 2 after the subscription indication sending submodule 123 sends an indication of service subscription activation to the terminal 2, where the NOTIFY message prompts other terminals not to subscribe to the service any more.

The processing module 12 includes a priority judging submodule 126, which is configured to: judge whether it is necessary to send a service message to the terminal 2 according to the service priority reported by the terminal 2; and notify the service message sending submodule 124 to send a service message to the terminal 2 if necessary.

The processing module 12 includes a network configuration storing submodule 127 and a preferred terminal judging submodule 128. The network configuration storing submodule 127 is configured to store network configuration. The preferred terminal judging submodule 128 is configured to: judge whether the terminal 2 is the preferred terminal according to the network configuration stored by the network configuration storing submodule 127 and the device ID of the terminal 2, and notify the service message sending submodule 124 to send a service message to the terminal 2 if the terminal 2 is determined as the preferred terminal.

The processing module 12 includes: a policy list receiving submodule 129, configured to receive an HTTP Post policy list from the terminal 2, where the HTTP Post policy list is a list of priorities of the terminals 2 for receiving the service; and a policy judging submodule 130, configured to select the terminal of the highest priority for receiving the service message according to the HTTP Post policy list when a service arrives.

The user ID may be any identifier that identifies the user, for example, a SIP URI or a TEL URI. The SIP URI may be sip: a@example.com or sip: 1234567890@example.com.

The TEL URI may be tel:1-123-456-7890. For example, a private user ID may be username@example.com.

The foregoing embodiments of the present invention provide solutions to sending a message to a plurality of terminals of a user in the Push mechanism. When a user has a plurality of terminals, a specific terminal is selected for receiving an incoming service according to the request of the terminal and the terminal request information carried in the request. When a service arrives, the service message is sent to the selected terminal according to the request information. In this way, a service message is not sent to all terminals of a user; the waste of network resources is avoided; a plurality of terminals of the user do not receive the same message repeatedly; and the receiving of other services is not affected by arrival of the same messages.

The messages given herein are for the exemplary purpose only. The present invention is not limited to the given message methods or message header fields, and other message methods and message header fields capable of the functions of the present invention are covered in the scope of protection of the present invention.

Through the foregoing description of the embodiments of the present invention, those skilled in the art are clearly aware that the present invention may be implemented by means of hardware, or by means of software in addition to a necessary universal hardware platform. Therefore, the technical solution under the present invention may be embodied as a software product. The software product may be stored in a non-volatile storage medium (such as a CD-ROM, a USB disk, or a mobile hard disk), and may include several instructions that enable a computer device (such as a personal computer, a server, or a network device) to perform the methods provided in the embodiments of the present invention.

Although the invention has been described through several preferred embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for processing a service message, comprising:
   receiving, by a Push Proxy Gateway (PPG), a request message for subscribing to a service from one terminal of a plurality of terminals each having a device identifier (ID) and a same user ID, wherein the request message carries request information of the one terminal comprising the user ID, the device ID, and an application ID;
   according to the user ID and the application ID carried in the request information, judging, by the PPG, whether the service requested by the one terminal has been requested by another terminal of the plurality of terminals; and
   when the service arrives at the PPG, sending, by the PPG, the service message to the one terminal according to the request information if no terminal has requested the service.

2. The method of claim 1, wherein after receiving the request message from the one terminal, the method further comprises:
   sending an activation indication of service subscription to the one terminal to indicate that the service subscription is activated.

3. The method of claim 1, wherein after receiving the request message from the one terminal, the method further comprises:
   sending a prompt message to other terminals of the plurality of terminals to indicate that the service has been subscribed to by the one terminal.

4. A Push Proxy Gateway (PPG) comprising:
   a request receiving module, configured to receive a request message for subscribing to a service from one terminal of a plurality of terminals each having a device identifier (ID) and a same user ID, wherein the request message carries request information of the one terminal comprising the user ID, the device ID, and an application ID;
   a judging module, configured to judge whether the service requested by the one terminal has been requested by another terminal of the plurality of terminals according to the user ID and the application ID carried in the request information;
   a processing module, configured to send a service message to the one terminal according to the request information if it is judged by the judging module that no terminal has requested the service when the service arrives at the PPG.

5. The PPG of claim 4, wherein the processing module comprises:
   a subscription indication sending submodule, configured to send an activation indication of service subscription to the one terminal if the judging submodule determines that no terminal has requested the service.

6. The PPG of claim 5, wherein the processing module further comprises:
   a prompt response returning submodule, configured to return a prompt response indicative of a subscribed state of the service to the one terminal if the judging submodule determines that another terminal has requested the service.

7. The PPG of claim 5, wherein the processing module further comprises:

a prompt message sending submodule, configured to send a NOTIFY message to other terminals after the subscription indication sending submodule sends the activation indication of service subscription to the one terminal, wherein the NOTIFY message prompts the other terminals not to subscribe to the service any more.

8. A method for processing a service message, comprising:

receiving, by a Push Proxy Gateway (PPG), a request message for subscribing to a service from a plurality of terminals each having a device identifier (ID) and a same user ID, wherein the request message carries request information comprising the user ID, the device ID, an application ID and a corresponding priority;

when the service arrives at the PPG, according to the priority carried in the request information, sending, by the PPG, the service message to one terminal of the plurality of terminals which has a highest priority.

9. The method of claim 8, further comprising:

sending, by the PPG, the service message to a terminal of a priority next to the highest priority if the service message fails to be sent to the one terminal of the highest priority.

10. A Push Proxy Gateway (PPG) comprising:

a request receiving module, configured to receive a request message for subscribing to a service from a plurality of terminals each having a device identifier (ID) and a same user ID, wherein the request message carries request information comprising the user ID, the device ID, an application ID and corresponding priority;

a processing module, configured to send, according to the priority carried in the request information, the service message to one terminal of the plurality of terminals which has a highest priority when the service arrives at the PPG.

11. The PPG of claim 10, wherein the processing module comprises:

a policy list receiving submodule, configured to receive a policy list from the plurality of terminals, wherein the policy list is a list of priorities of terminals for receiving the service; and a policy judging submodule, configured to select the terminal of a highest priority for sending the service message according to the policy list.

12. A system for processing a service message, comprising:

a plurality of terminals each having a device identifier (ID) and a same user ID, wherein each of the plurality of terminals is configured to send a request message to the PPG for subscribing to a service, wherein the request message carries request information comprising the user ID, the device ID, and an application ID; and a Push Proxy Gateway (PPG) which comprises:

a request receiving module, configured to receive the request message from one terminal of the plurality of terminals, wherein the request message carries request information of the one terminal comprising the user ID, the device ID, and the application ID;

a judging module, configured to judge whether the service requested by the one terminal has been requested by another terminal of the plurality of terminals according to the user ID and the application ID carried in the request information of the one terminal; and a processing module, configured to send the service message to the one terminal according to the request information if it is judged by the judging module that no terminal has requested the service when the service arrives at the PPG.

13. A system for processing a service message, comprising:

a plurality of terminals each having a device identifier (ID) and a same user ID, wherein each of the plurality of terminals is configured to send a request message to the PPG for subscribing to a service, wherein the request message carries request information comprising the user ID, the device ID, and an application ID; and a Push Proxy Gateway (PPG) which comprises:

a request receiving module, configured to receive a request message for subscribing to a service from a plurality of terminals each having a device identifier (ID) and a same user ID, wherein the request message carries request information comprising the user ID, the device ID, an application ID and corresponding priority; and a processing module, configured to send, according to the priority carried in the request information, the service message to one terminal of the plurality of terminals which has a highest priority when the service arrives at the PPG.

14. The system of claim 13, wherein the processing module comprises:

a policy list receiving submodule, configured to receive a policy list from the plurality of terminals, wherein the policy list is a list of priorities of terminals for receiving the service; and a policy judging submodule, configured to select the terminal of a highest priority for sending the service message according to the policy list.

* * * * *